(12) United States Patent
Navarra Pruna

(10) Patent No.: US 12,350,862 B2
(45) Date of Patent: Jul. 8, 2025

(54) DATING SYSTEM FOR MOLDS

(71) Applicant: COMERCIAL DE UTILES Y MOLDES, S.A., Barcelona (ES)

(72) Inventor: Alberto Navarra Pruna, Barcelona (ES)

(73) Assignee: COMERCIAL DE UTILES Y MOLDES, S.A., Barcelona (ES)

( * ) Notice: Subject to any disclaimer, the term of this patent is extended or adjusted under 35 U.S.C. 154(b) by 551 days.

(21) Appl. No.: 17/132,487

(22) Filed: Dec. 23, 2020

(65) Prior Publication Data

US 2021/0197422 A1 Jul. 1, 2021

(30) Foreign Application Priority Data

Dec. 27, 2019 (ES) ................................ ES201931161

(51) Int. Cl.
*B29C 33/42* (2006.01)

(52) U.S. Cl.
CPC .................................. *B29C 33/428* (2013.01)

(58) Field of Classification Search
CPC .... B29C 45/374; B29C 45/372; B29C 33/428
See application file for complete search history.

(56) References Cited

U.S. PATENT DOCUMENTS

| | | | | |
|---|---|---|---|---|
| 4,708,314 A | * | 11/1987 | Kuhling | B29C 33/428 164/229 |
| 6,308,929 B1 | * | 10/2001 | Wieder | B29C 45/2703 249/103 |
| 2004/0178319 A1 | * | 9/2004 | Pruna | B29C 33/428 249/103 |
| 2005/0199142 A1 | * | 9/2005 | Uratani | B44B 5/026 101/28 |
| 2007/0145232 A1 | * | 6/2007 | Uratani | B29C 45/345 249/103 |

FOREIGN PATENT DOCUMENTS

| | | | | |
|---|---|---|---|---|
| CN | 209631915 U | * | 11/2019 | |
| EP | 0628396 A | * | 12/1993 | |
| FR | 2620370 A1 | | 3/1989 | |
| FR | 2644610 A1 | | 9/1990 | |
| FR | 2692519 A1 | | 12/1993 | |
| FR | 2806027 A1 | | 9/2001 | |
| JP | 2000280259 A | * | 10/2000 | ........... B29C 45/374 |

* cited by examiner

*Primary Examiner* — Xiao S Zhao
*Assistant Examiner* — Victoria Bartlett

(57) ABSTRACT

The dating system for molds comprises at least one date stamp (12) connected to a knob (4) through a connection cable (1), wherein the date stamp (12) comprises an engraving formed only by numbers and/or letters and a position indicator. Furthermore, said knob (4) is mounted on a control block (2) comprising a reading engraving (3) located around said knob (4), in correspondence with the engraving of said date stamp (12). This makes it possible to manufacture date stamps with the information, without relief, since the simple contrast of the areas of the date stamp polished with high gloss and the nuanced numbers or letters, offer a visual contrast that allows clearly identifying the information that the date stamp must transmit.

13 Claims, 2 Drawing Sheets

DATING SYSTEM FOR MOLDS

The present invention relates to a dating system for molds.

BACKGROUND OF THE INVENTION

In the manufacture of plastic parts by injection, it is common to mark the manufacturing date on the injected part in order to know at all times the real traceability of the production process, and to be able to know the complete history of both the material used and the guarantee of its origin.

For this purpose, it is usual that the date is marked in relief at the same time of injection.

For this there are different models of date stamps, which have engraved different numbers arranged on a cylinder that is engraved on the circular perimeter with the numbers corresponding to the date of their manufacture, there are different combinations of numbers depending on whether you want to engrave the day, the week, the month, the year, etc.

For example, in the months of the year model, the numbers from 1 to 12 are engraved on this perimeter, as a watch, and inside this same cylinder, and so that it can rotate on its own axis, it carries another cylinder of smaller diameter that includes an arrow to indicate the number.

The particularity of this arrow is that it is engraved in low relief, with the necessary depth that by using a screwdriver it can be rotated, in order to indicate the position of the desired number, also in the event that the date stamp indicates the 12 months, it is usual that in the same cylinder with a smaller diameter, it also includes the last two digits of the corresponding year, in these cases it is mandatory that at each end of the year, the cylinder with a smaller diameter is completely replaced by a new one that corresponds to the new year, in all cases the use of a screwdriver is unavoidable to rotate the central axis so that the arrow indicates the corresponding number.

All this undoubtedly of small diameter, since this date stamp must be inserted in some part of the mold that corresponds to the figure surface, normally any part of the punch of the mold is the appropriate place for it.

In the case of the example that is described, it is at the end of the month that the injection of the part must be stopped momentarily, in order to proceed with the rotation, using a screwdriver so that the indicator arrow, from that moment on, points to the new month, while at each end of the year production must be stopped for the time necessary to proceed with the total change of the indicator cylinder.

There are infinite possibilities for marking, although perhaps the most common is the one that indicates the month and year of manufacture. In the models that require more detailed information, it is usual to use other additional date stamps, to mark all the information that the product may require in the same injection process.

Be that as it may, it is essential to stop production momentarily, as well as to open the mold, so that the operator can proceed to rotate the arrow, whether it is a single date stamp or several date stamps, and even if the mold has one or more cavities, in many cases due to the situation of the date stamps, the change requires some specialization, and even screwdrivers suitable for the size of the rotary axis groove, sometimes due to lack of operator skill, due to poor visibility of the position of the date stamp, or due to the misuse of the screwdriver, damage to the mold occurs, also in many cases the position of the arrows is incorrectly marked and the pieces are marked with erroneous data.

All this is reduced to the fact that the date stamp becomes a nuisance, and that it is entirely foreseeable that the piece will not be controlled as the product demands require, it is completely impossible that depending on how it depends on human intervention, and in fabrications that in many cases work 24 hours a day with different operators, and that in many cases the same operator controls several machines, all the pieces reflect the veracity of the data that are stipulated as guarantees of manufacturing control.

DISCLOSURE OF THE INVENTION

Therefore, an objective of the present invention is to provide a dating system for molds that eliminates these types of problems.

In addition, it should be noted that its use does not require opening the mold and its manipulation with often inappropriate tools, so that the neatness and cleanliness with our proposal is completely guaranteed. Furthermore, the dating system according to the present invention can fully enter a new market aimed mainly at all types of production that due to their peculiarities require to be produced in so-called "clean rooms".

The dating system for molds according to the present invention is described in the independent claim, and further features are defined in the dependent claims.

It should be noted that the dating system comprises as many date stamps as necessary, for example, a date stamp for the year, a date stamp for the month and a date stamp for the day.

The reason for the present invention comes to cover the solution to this important problem from two embodiments of the dating system according to the present invention, which are of identical operation with the exception that the first embodiment is manually operated, and the second embodiment is activated automatically, which represents a great advance in eliminating positioning problems, since it will be done through a clock that will mark the change times on a regular basis.

The first embodiment, called the manual model, is a dating system that does not include any groove for changing the information, and wherein the inner cylinder is simply marked with the indicator arrow, without any groove for inserting the screwdriver. That is to say, the date stamp comprises an engraving consisting solely of numbers and/or letters and a position indicator (the indicating arrow).

This makes it possible to manufacture date stamps with the information, without relief, since the simple contrast of the areas of the date stamp polished with high gloss and the nuanced numbers or letters, offer a visual contrast that allows clearly identifying the information that the date stamp must transmit.

All thermoplastic materials clearly reflect the finish of the surfaces of the mold with which they have been manufactured and this factor is essential to adapt this system of "engravings" for all molds intended to work in so-called clean rooms.

The information will be changed for all purposes from the lower part of the date stamp itself, so that the surface of the cylinder will be marked on its perimeter with the combination of numbers that you want to highlight only, while the surface of the internal cylinder only will be marked with the indicator arrow.

The date stamp itself is like a conventional date stamp with the difference that on its back it incorporates a cable housed inside the diameter of the smaller cylinder, which is fixed by means of a precision pressing that confers it as a single rotating element, this cable is the one that must be cut to the desired length in the final assembly of the set.

Consequently, the positioning of the date stamp through a knob placed outside the mold, and always faced in such a way that the operator of the injection machine can view the engraved information at all times.

The operation of the second embodiment of the dating system of the present invention, also called the automatic model, is the same as the manual, with the exception that instead of changing the information the injection operator will be carried out through a motor.

The system described above incorporates a motor for each of the information systems required.

Thus, the described control box incorporates in each connection unit a motor mounted in parallel with each of the axes and by means of a set of gears that transmit a duly controlled rotation equivalent to the angle of rotation of each of the date stamps.

The moment of the information change will be done automatically thanks to the computerized use of a perpetual calendar.

A clear example of its operation is based on the Gregorian calendar, with the information of the day, month and year that will be engraved on each mold.

Three individual date stamps will be necessary to engrave this information, the first date stamp will be radially engraved with the numbers equivalent to 31 days, as a complete turn of the indicator arrow is exactly equivalent to 360°, the turn that must be made in each daily change will be the result of dividing the 360° of the circumference by the number of stops it must make, to mark each of the days, that is, 31, which is equivalent to one turn for each change of 11.61290°.

The second date stamp will be engraved radially with the numbers equivalent to 12 months, that is, the rotation that this date stamp should make will be exactly the result of dividing 360° by the 12 months, which is equivalent to 30° turn in each change.

The third date stamp will be radially engraved with the numbers equivalent to the years that we want to engrave, in this case 10 years, that is, the rotation that this date stamp must make will be the result of dividing 360° by 10 years, which is equivalent to a 36° rotation at every change.

The computer chip with the daily change programming will be included in each mold, so that when installing the mold in the machine it will be essential to connect it to the electrical circuit of the system.

Each chip will include the Gregorian calendar programmed in such a way that each day at 12 o'clock at night it will send an electrical signal that, properly channeled to the appropriate motor, will make it perform the programmed rotation.

That is to say, that daily at 12 o'clock at night it will cause the indicator arrow on the days date to make the rotation, turning at this moment to mark the change of information to all the pieces that are injected from this moment on. The same procedure will be applied in the change of months, but it will only recognize the signal at 12 o'clock at night of the day that the Gregorian calendar indicates the change of the month, and the same will happen in the calendar of years when the calendar indicates 12 of the night of December 31, equivalent to the end of each year.

Since all the months of the year do not have the same number of days, and every four years one more day is added in February, the duly programmed computer system is in charge of making the appropriate adjustment to so that, at the time of change, each motor receives the appropriate impulses to perform one or more rotations in order to channel the information from the date stamps appropriately.

Like the manual model, in each new installation of the mold in the machine it is necessary to position the date stamps through the external knob so that the current day, month and year is actually positioned. At the moment of connecting the mold to the electrical system of the machine, the mold becomes completely automatic, and it will take care of making all the changes that the system requires without having to stop the machine to make the information changes of the traditional date stamps, in this way we are guaranteeing a perfect traceability to the mold, guaranteeing the exact manufacturing dates of the injected products.

BRIEF DESCRIPTION OF THE DRAWINGS

For better understanding of what has been disclosed, some drawings in which, schematically and only by way of a non-limiting example, a practical case of embodiment is shown.

DESCRIPTION OF A PREFERRED EMBODIMENT

Figure 1:
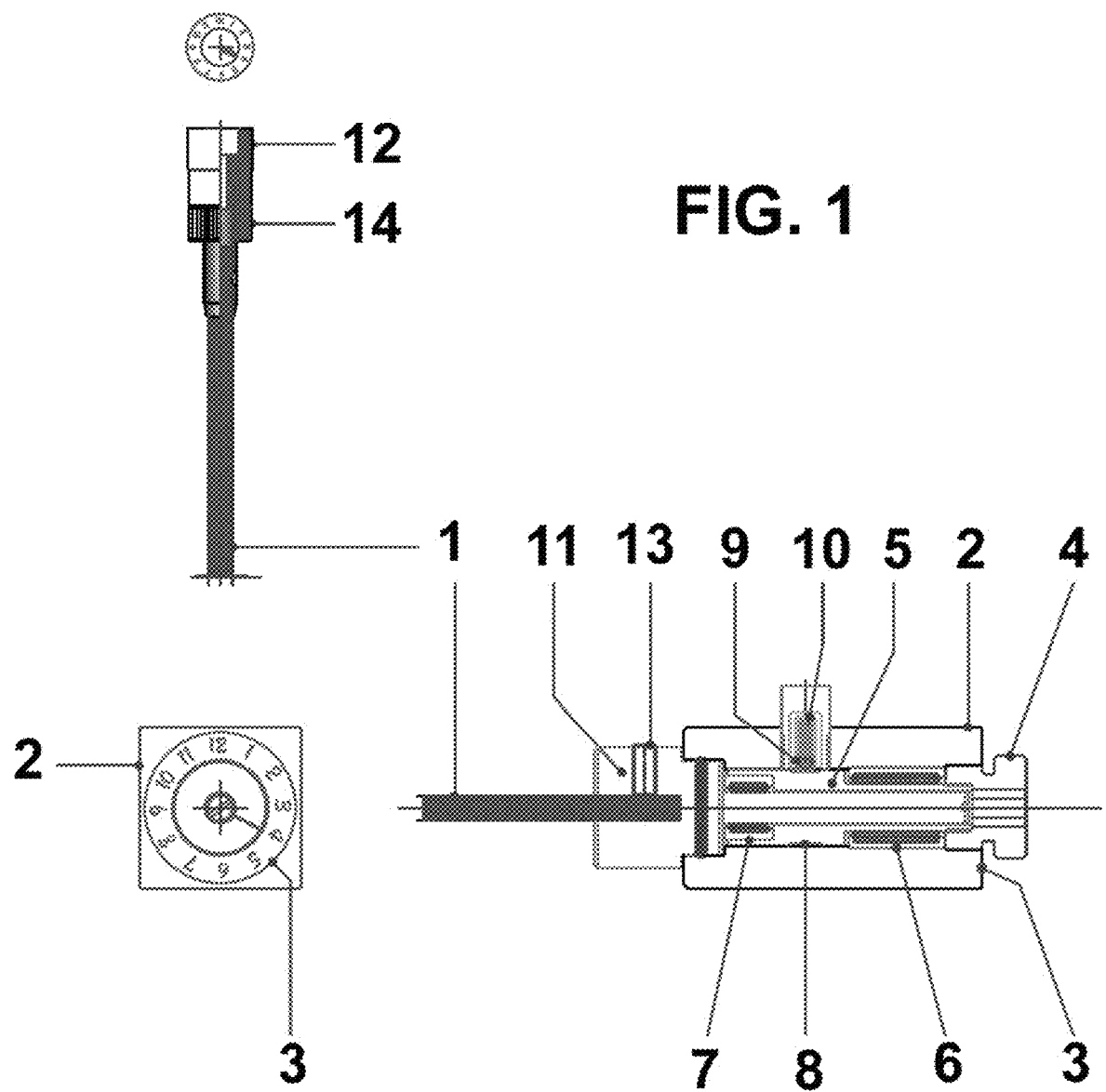
FIG. 1 is a schematic sectional view of a first embodiment of the dating system for molds according to the present invention.

FIG. 1 shows a first embodiment of the dating system for molds according to the present invention, called the manual model.

It should be noted that the dating system according to the present invention comprises as many date stamps as necessary, for example, a date stamp for the year, a date stamp for the month and a date stamp for the day. For the sake of simplicity, a date stamp for the month has been shown in the figures.

In the first place, as it is intended to be able to manufacture date stamps for molds with "engravings" of minimal relief, it is necessary to be able to position the date stamp with maximum precision in the nailing that is carried out to fix it to the mold by means of holes. As the precision of the holes in the mold is important, the dating system comprises a date stamp 12 provided with an adjustment nut 14 in its lower part so that it can be disassembled and duly rectified so that the total height of the date stamp 12 is exactly the same as the depth of the drilled holes.

In this way, it is achieved that the final surface of the date stamps 12 stuck in the mold are completely aligned with the surface of the mold. This detail acquires great relevance in all molds that must work in "clean rooms", since any relief or misalignment between these surfaces can become infectious areas in products for food, pharmaceutical and cosmetic sectors.

Each date stamp requires a connection mechanism to be positioned, so a control block 2 will house as many connection mechanisms inside it, as date stamps needed, this block will be engraved on the outside so that it coincides with each of the knobs, the reading engravings corresponding to each of the date stamps that each mold incorporates.

Each control block 2 comprises a knob 4, which is preferably knurled to be able to generate a properly controlled rotation. This knob 4 is connected via a thread to an axis 5 with a through hole.

On its exterior, the axis 5 incorporates a single direction bearing 6 that facilitates its unidirectional rotation. This same axis 5 comprises a larger diameter area, which inside it incorporates a second bearing 7 with the same single direction of rotation, and a series of radial grooves 8 have been machined on the outside of this diameter to accommodate a ball 9, which, pressed by a spring 10, fixes each of these grooves 8 in a completely controlled manner. Each axis 5 contains as many grooves 8 as positions are necessary to indicate the indications that each date stamp requires.

A centered axis 11 within this second bearing 7 contains at one end an area of greater diameter with a hole of a certain depth, to house a connection cable 1, which connects the date stamp 12 with the knob 4.

At this end of greater diameter, a screw 13 housed perpendicular to axis 11 will be housed in order to tighten and fix the connection cable 1.

At the other end of this axis 11 a groove is machined to accommodate a screwdriver with which it will allow us to rotate the cable that is connected to the date stamp 12 from outside the mold, in order to be able to adjust the engraving of the date stamp 12 with great precision with its equivalent with the reading engravings 3 of the control block 2.

In its most usual version, the control block 2 usually has a month date stamp and a year date stamp, so in this case the control block 2 will only consist of two connection mechanisms, one with twelve grooves equivalent to those of 12 months of the year, while the other could host 10 grooves for a period equivalent to 10 years.

This date stamp system allows to carry out all the changes to the information of the different date stamps without tools and from outside the mold, with the savings that this represents, since, for the changes of information, it is not necessary to stop production.

To connect the set so that both the date stamp 12 of the mold and the knob 4 coincide with the same number, it is as follows:

Once the date stamp 12 has been installed in its housing and the control block 2 on the outside of the mold, the length of the connection cable 1 must be cut to achieve the appropriate length for each installation, and it will be fixed with the screw 13 housed in the direction perpendicular to the axis 11 that has the groove for the screwdriver.

Next, by means of the knob 4 we will rotate the connection mechanism in the only direction of rotation that the system allows, so that any of the grooves 8 machined in the outer diameter of the housing of the second single rotation bearing 7, is positioned with the ball 9 pressed with a spring 10, we will take note of the number that is blocked and with this data with the screwdriver we will rotate the axis 11 that houses the connection cable 1 in the only direction that the system allows, until we equalize the number of the date stamp 12 with the number of the reading engraving 3.

From this moment on, any position reflected in the control block 2 will coincide in a fixed way with the corresponding date stamp 12.

When putting the mold on the machine for a new manufacture, we must set the current date through the knobs.

All changes to the information of the different date stamps can be verified from outside the mold, and all changes related to the manufacturing dates can be made from the outside.

Figure 2:
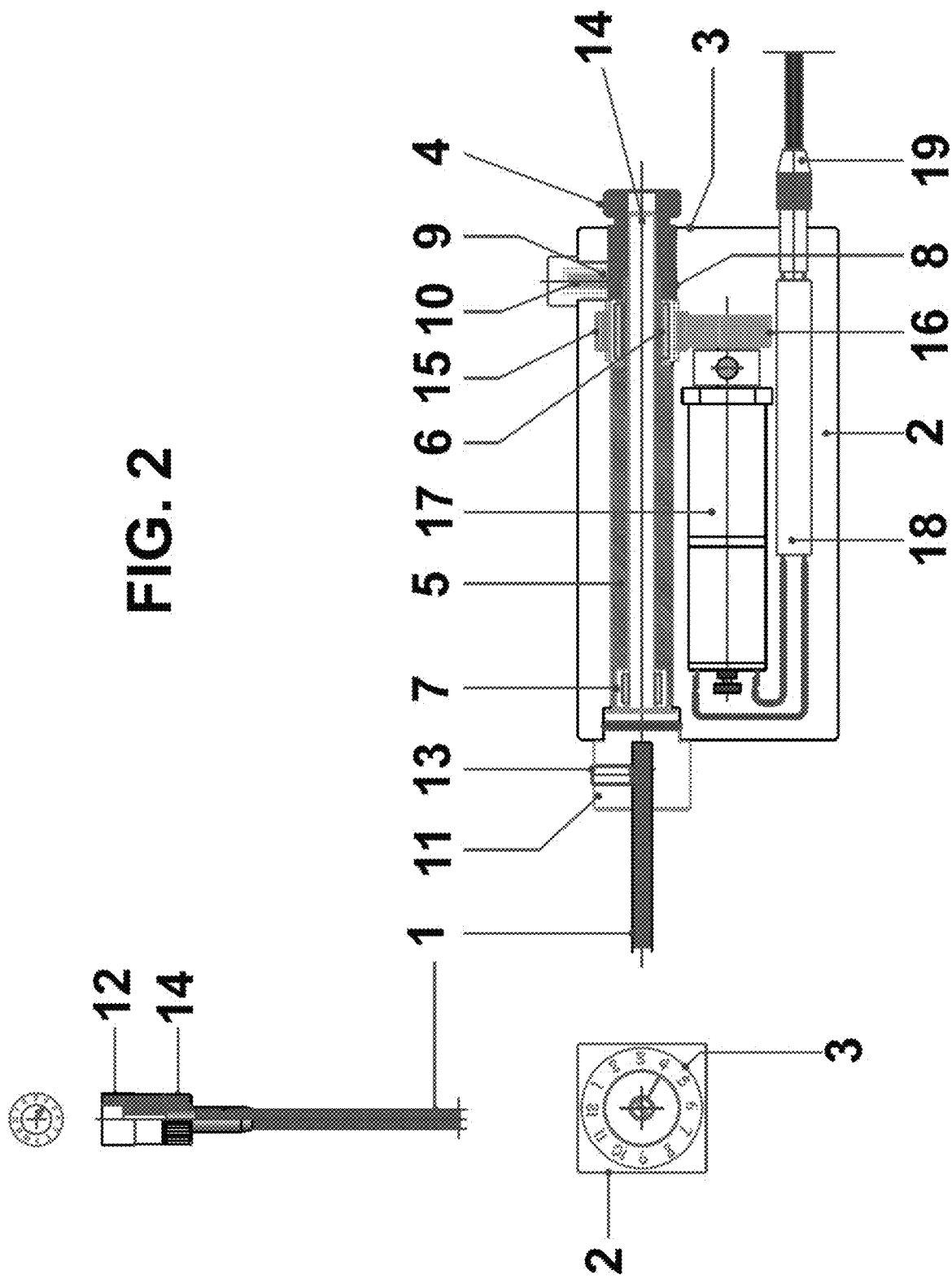
FIG. 2 is a schematic sectional view of a second embodiment of the dating system for molds according to the present invention.

FIG. 2 shows a second embodiment of the dating system for molds according to the present invention, also called the automatic model.

For the sake of simplicity, the common elements are not described again. In addition, the same numerical references are used for their identification.

The connection mechanism has the same operating concept as the manual system, but adding a motor 17 that meshes with the through-hole axis 5 by means of gears 15, 16 which, when the motor 17 rotates, causes the axis 5 to rotate in a programmed way, and through the connection cable, rotate the cylinder of smaller diameter that is engraved with the arrow that indicates the position of each number engraved circularly on the cylinder of larger diameter of the date stamp 12.

Thus, the rotation that in the manual model was operated by hand passes in this way to perform the same function, but in a programmed way, through the algorithm of the Gregorian calendar, and programmed through an electronic program, which manages to transmit an electrical signal every 24 hours coinciding with the end of the day.

The molds that include the day, month, and year in their information, those that are considered to be controlled traceability.

Taking as a starting point this electrical signal to be used as coordinator of all the rotary movements of each motor 17, for this end we differentiate three channels of this signal, one for the day motor, another for the month motor, and another for the year motor.

In the case of the day motor 17, an electronic board 18 must have the calendar programmed in such a way that each day date stamp that contains 31 consecutive numbers and that are equivalent to the maximum days it has each month, at 12 o'clock at the day that ends, it emits the appropriate signal so that the motor 17 of this date stamp recognizes that it has to carry out the rotation to numerically indicate the new day.

This routine is repeated annually 7 times, which are equivalent to the months: January, March. May, July, August, October, and December, but not in February, April, June, September, and November.

For these cases, it is necessary to make an alteration in the electronic program so that in the month of February of the conventional year at 12 o'clock at night on the 28th, the motor 15 receives the signal to skip the days 29, 30 and 31, at so that, in the marking of the date stamp, the indicator arrow points to the number 1 as the first day of March.

In leap years, the program will be altered at 12 o'clock at night on the 29th, and motor 17 will receive the signal to skip days 30 and 31 so that on the marking of the date stamp the indicator arrow points to 1 as the first day of March.

In the months of April, June, September, and November, it will be on the 30th at 12 o'clock at night, when the motor will receive the signal to skip the 31st, so that, on the date stamp, the indicator arrow points to the day 1 of the following month.

The same program of the days will also serve as the basis for the months, whose date stamp always has 12 consecutive numbers, in this case the incidence will only be to take advantage of the day's signal, since, in this case, the date stamp that contains only the 12 numbers of the months, you do not have to skip any number to indicate the change of month.

In the case of years, it will only be taken as a reference on December 31 at 12 at night, since the years are always correlative to the numbers engraved on the date stamp.

To start up the mold, it proceeds as with the manual system, that is, we must mark the current date through the knobs 4, also the coincidence of number of the date stamp 12 with that of the knob 4, they are set in the same way, simply in the automatic system, we must connect the computer system through a connector cable 19 so that it can send all the pertinent information to the mold.

Although reference has been made to specific embodiments of the invention, it is apparent to a person skilled in the art that the described dating system for molds is susceptible of numerous variations and modifications, and that all the details mentioned can be replaced by other technically equivalents, without departing from the scope of protection defined by the appended claims.

The invention claimed is:

1. A dating system for molds, comprising at least one date stamp connected to a knob through a connection cable, characterized in that the date stamp comprises an engraving formed only by numbers and/or letters and a position indicator,
    wherein said knob is formed at one end of an axis, said knob and said axis being rotatable only in one direction,
    wherein said knob is mounted on a control block comprising a reading engraving located around said knob, in correspondence with the engraving of said date stamp,
    wherein said axis is mounted on the control block by a first single direction bearing and a second single direction bearing, and
    wherein said axis has a first portion with a first diameter and a second portion with a second diameter larger than the first diameter, the first portion incorporates said first single direction bearing, and the second portion incorporates said second single direction bearing inside thereof.

2. The dating system for molds according to claim 1, wherein said axis comprises a plurality of radial grooves, for housing a ball pressed by a spring.

3. The dating system for molds according to claim 1, wherein said knob is disposed at one end of said control block, and a centering axis is mounted at the other end of said control block.

4. The dating system for molds according to claim 3, wherein said centering axis comprises a screw transverse to said connection cable.

5. The dating system for molds according to claim 3, wherein said knob is disposed at one end of said control block, and a centering axis is mounted at the other end of said control block, and wherein said control block, said knob, and said centering axis together enclose the said axis.

6. The dating system for molds according to claim 1, wherein said date stamp comprises an adjusting nut.

7. The dating system for molds according to claim 1, wherein said axis is driven by a motor.

8. The dating system for molds according to claim 7, wherein said motor is connected to an electronic board, which is configured for driving the motor to rotate the axis by a preset amount of degrees.

9. The dating system for molds according to claim 7, wherein the output of the motor comprises a motor gear meshing with a gear mounted on the axis.

10. The dating system for molds according to claim 1, wherein said second single direction bearing is disposed farther from said knob than said first single direction bearing.

11. The dating system for molds according to claim 1, wherein the first portion of said axis is connected with said knob with a through hole.

12. A dating system for molds, comprising at least one date stamp connected to a knob through a connection cable, characterized in that the date stamp comprises an engraving formed only by numbers and/or letters and a position indicator,
    wherein said knob is formed at one end of an axis, said knob and said axis being rotatable only in one direction,
    wherein said knob is mounted on a control block comprising a reading engraving located around said knob, in correspondence with the engraving of said date stamp,
    wherein said axis is mounted on the control block by a first single direction bearing and a second single direction bearing,
    wherein said second single direction bearing is disposed farther from said knob than said first single direction bearing, and
    wherein said axis has a first portion with a first diameter and a second portion with a second diameter larger than the first diameter, the first portion incorporates said first single direction bearing, and the second portion incorporates said second single direction bearing inside thereof.

13. The dating system for molds according to claim 12, wherein the first portion of said axis is connected with said knob with a through hole.

\* \* \* \* \*